United States Patent
Miyazaki et al.

(10) Patent No.: US 11,171,471 B2
(45) Date of Patent: Nov. 9, 2021

(54) ELECTRIC CONNECTION BOX

(71) Applicant: Yazaki Corporation, Tokyo (JP)

(72) Inventors: Yoshiya Miyazaki, Makinohara (JP); Nobutaka Kaneko, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/869,054

(22) Filed: May 7, 2020

(65) Prior Publication Data
US 2020/0389001 A1  Dec. 10, 2020

(30) Foreign Application Priority Data
Jun. 10, 2019 (JP) .............................. JP2019-108141

(51) Int. Cl.
| | |
|---|---|
| *H02G 3/08* | (2006.01) |
| *B60R 16/02* | (2006.01) |
| *B60R 16/023* | (2006.01) |
| *H02G 3/10* | (2006.01) |
| *H05K 5/00* | (2006.01) |

(52) U.S. Cl.
CPC ............. *H02G 3/081* (2013.01); *B60R 16/02* (2013.01)

(58) Field of Classification Search
CPC . H02G 3/08; H02G 3/081; H02G 3/10; B60R 16/02; B60R 16/0238
See application file for complete search history.

(56) References Cited

U.S. PATENT DOCUMENTS

| | | | | |
|---|---|---|---|---|
| 2005/0056447 | A1* | 3/2005 | Nakamura | H05K 5/0073 174/58 |
| 2005/0130460 | A1* | 6/2005 | Kiyota | B60R 16/0238 439/76.2 |
| 2010/0258328 | A1* | 10/2010 | Kiyota | H05K 5/0073 174/50 |
| 2015/0303666 | A1* | 10/2015 | Shimizu | H05K 5/0056 361/752 |
| 2016/0104983 | A1* | 4/2016 | Nakayama | H01R 13/74 174/541 |
| 2016/0315455 | A1* | 10/2016 | Kiyota | B60R 16/0238 |

FOREIGN PATENT DOCUMENTS

| | | |
|---|---|---|
| CN | 201611714 U | * 10/2010 |
| CN | 201611714 U | 10/2010 |
| JP | 2005-51880 A | 2/2005 |

* cited by examiner

*Primary Examiner* — Hoa C Nguyen
*Assistant Examiner* — Amol H Patel
(74) *Attorney, Agent, or Firm* — Sughrue Mion, PLLC

(57) ABSTRACT

An electric connection box includes a housing configured to accommodate at least one electronic component and an attachment portion provided on the housing, the attachment portion including a through hole through which a fastening member is to be inserted and an attachment surface configured, when the housing is attached to an object, to face the object, the housing being to be attached to the object at the attachment portion by the fastening member. A plurality of recessed portions are provided around an edge portion defining the through hole, the plurality of recessed portions being provided on the attachment surface. At least one of the plurality of recessed portions is provided with an entry prevention portion configured to prevent the fastening member from entering the recessed portion.

6 Claims, 3 Drawing Sheets

ELECTRIC CONNECTION BOX

CROSS-REFERENCE TO RELATED APPLICATION

The present application claims priority to Japanese Patent Application No. 2019-108141 filed on Jun. 10, 2019, the entire content of which is incorporated herein by reference.

TECHNICAL FIELD

The present invention relates to an electric connection box.

BACKGROUND

A related an electric connection box such as a relay box is mounted on a vehicle and accommodates an electronic component such as a relay (see JP-A-2005-51880, for example). A bracket for fixing the electric connection box to a part of the vehicle is usually provided integrally with a housing of the electric connection box. The bracket is provided with a through hole through which a fastening member such as a stud bolt is to be inserted, and is provided with an attachment surface at which the housing of the electric connection box is to be attached to the part of the vehicle, and the bracket is fixed to the part of the vehicle by the fastening member inserted through the through hole.

In general, the housing and the bracket of the electric connection box are resin molded products. For this reason, in order to prevent sink marks from occurring during resin molding, a plurality of recessed portions are often provided on the attachment surface of the bracket (an attachment portion). Due to this, when tire electric connection box is attached to the vehicle, a fastening member such as a stud bolt is erroneously inserted into the recessed portion positioned around an edge portion of the through hole, which may make it difficult to attach the electric connection box to the vehicle.

SUMMARY

Illustrative aspects of the present invention provide an electric connection box in which a fastening member can be prevented from being erroneously inserted into a recessed portion provided in the vicinity of an edge portion of a through hole on an attachment surface of an attachment portion.

According to an illustrative aspect of the present invention, an electric connection box includes a housing configured to accommodate at least one electronic component and an attachment portion provided on the housing, the attachment portion including a through hole through which a fastening member is to be inserted and an attachment surface configured, when the housing is attached to an object, to face the object, the housing being to be attached to the object at the attachment portion by the fastening member. A plurality of recessed portions are provided around an edge portion defining the through hole, the plurality of recessed portions being provided on the attachment surface. At least one of the plurality of recessed portions is provided with an entry prevention portion configured to prevent the fastening member from entering the recessed portion.

Other aspects and advantages of the invention will be apparent from the following description, the drawings and the claims.

DETAILED DESCRIPTION

Hereinafter, exemplary embodiments of the present invention will be described in detail with reference to the drawings. An electric connection box 1 according to an embodiment of the present invention shown in FIG. 1 will be described. The electric connection box 1 typically is to be mounted on a vehicle and is a relay box configured to accommodate an electronic component such as a relay. Hereinafter, for convenience of description, expressions "upper-lower directio", "upper", and "lower" indicate "upper-lower direction", "upper" and "lower" direction, sides, etc. in FIG. 1, respectively. When the electric connection box 1 is mourned on the vehicle, the "upper-lower direction" corresponds to an upper-lower direction of the vehicle.

Figure 1:
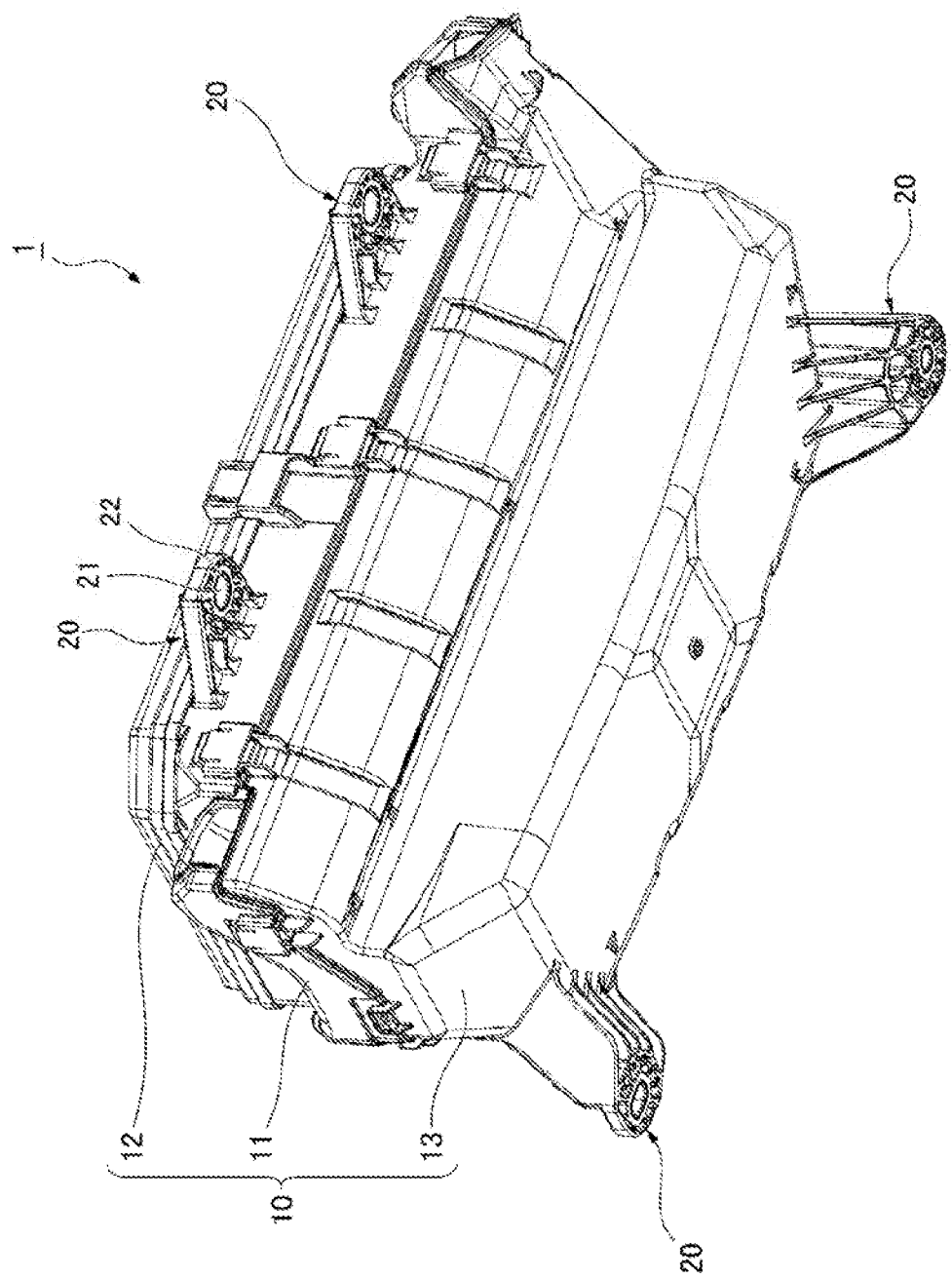
FIG. 1 is a perspective view of an electric connection box according to an embodiment of the present invention.

As shown tn FIG. 1, the electric connection box 1 made of a resin includes a housing 10 configured to accommodate a plurality of electronic components (not shown). In this example, the housing 10 includes a frame 11 having substantially rectangular frame-like shape configured to accommodate the plurality of electronic components, an upper cover 12 to be assembled from above to the frame 11 so as to close an upper opening of the frame 11, and a lower cover 13 to be assembled from below to the frame 11 so as to close a lower opening of the frame 11. All the three components of the electric connection box 1 are resin molded products.

A plurality of brackets 20 for fixing the electric connection box 1 to a part of the vehicle (an object to which the electric connection box 1 is to be attached) are provided integrally with the housing 10 so as to extend outward from a plurality of positions of the housing 10, respectively. Accordingly, each of the brackets 20 is also a resin molded product.

Figure 2:
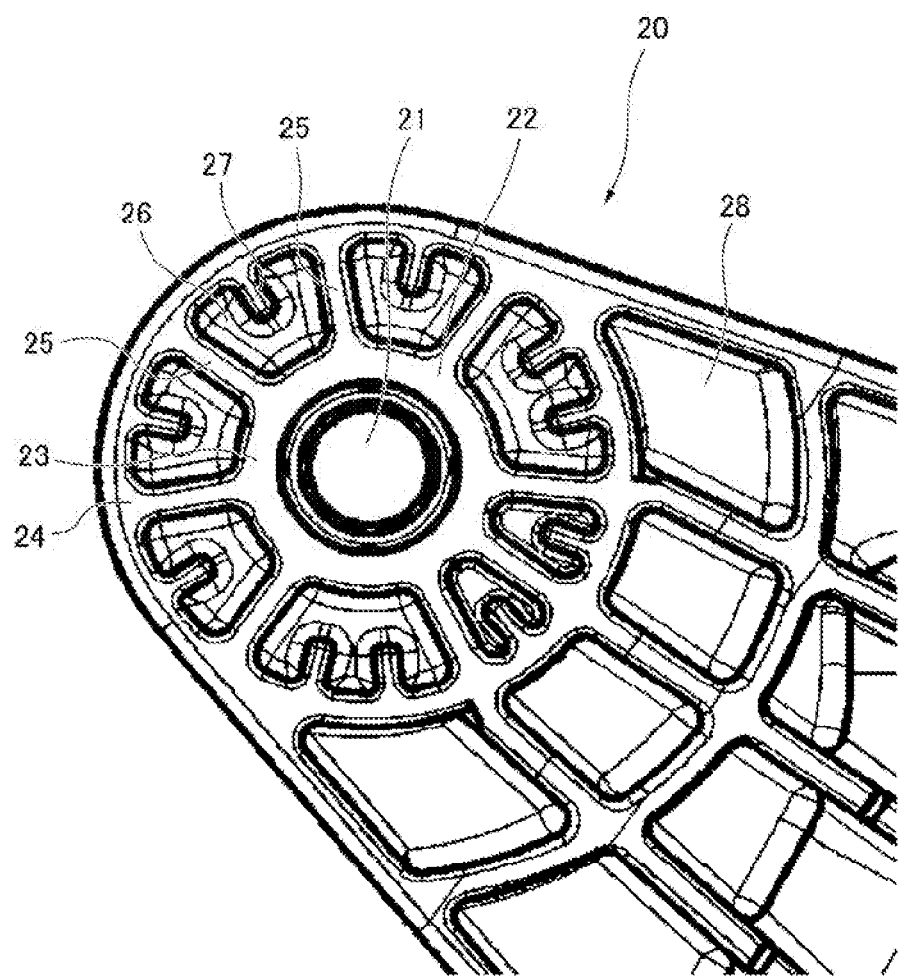
FIG. 2 is an enlarged view showing an attachment surface of a bracket shown in FIG. 1.

A lower surface of a tip end portion of each of the brackets 20 functions as an attachment surface 22 at which the electric connection box 1 is to be attached to the part of the vehicle. The attachment surface 2 faces the part of the vehicle when the electric connection box 1 is attached to the part of the vehicle. In this example, as shown in FIG. 2, the attachment surface 22 is a plane having a circular like shape. A through hole 21 extending in a direction orthogonal to the attachment surface 22 is formed at a center position of the circular attachment surface 22. A stud bolt, a weld bolt, or the like (hereinafter, referred to as a "fastening member 30") (see FIG. 3) fixed to the part of the vehicle is to be inserted into the through hole 21 from a side of an attachment surface 22, and each of the brackets 20 is fastened and fixed to the part of the vehicle using a nut or the like by being engaged with the fastening member 30, so that the electric connection box 1 is fixed to the part of the vehicle.

As described above, the bracket 20 is the resin molded product. Therefore, a plurality of recessed portions 26 are provided on the attachment surface 22 of the bracket 20 in order to prevent sink marks that may occur during resin molding. In this example, as shown in FIG. 2, an inner rib 23 having a circular shape is provided on an edge portion of the through hole 21 on the attachment surface 22. In other words, the inner rib 23 is provided around the through hole 21. A outer rib 24 having a circular shape and a circular are portion which is shared by the tip end portion of the bracket 20 is provided on the attachment surface 22. A plurality of radial ribs 25 extending radially with respect to the through hole 21 are provided between the inner rib 23 and the outer rib 24 on the attachment surface 22. Accordingly, the recessed portions 26 defined by the inner rib 23, the outer rib 24, and the radial ribs 25 adjacent to each other are formed at a plurality of positions on the attachment surface 22 in a circumferential direction of the through hole 21.

In this example, as shown in FIG. 2, a plurality of recessed portions 28 are also provided on the lower surface of the bracket 20 other than the attachment surface 22. In other words, the lower surface of the bracket 20 which is closer to a base of the bracket 20 than the attachment surface 22 being at the tip end portion of the bracket 20 are provided with the recesses portions 28, in order to prevent sink marks that may occur during the resin molding.

Protruding portions 27 each extending radially inward from a side wall arranged at a radially outer end of respective one of the recessed portions 26 toward an inside of the respective one of the recessed portions 26 are integrally provided in all the recessed portions 26, which are provided on the attachment surface 22. In this example, two protruding portions 27 are provided in one of the recessed portions 26 having a relatively longer length in a circumferential direction around the through hole 21, the two protruding portion 27 being arranged in the circumferential direction to be adjacent to each other, and one protruding portion 27 is provided on the recessed portion 26 having a relatively shorter length in the circumferential direction around the through hole 21.

Figure 3:
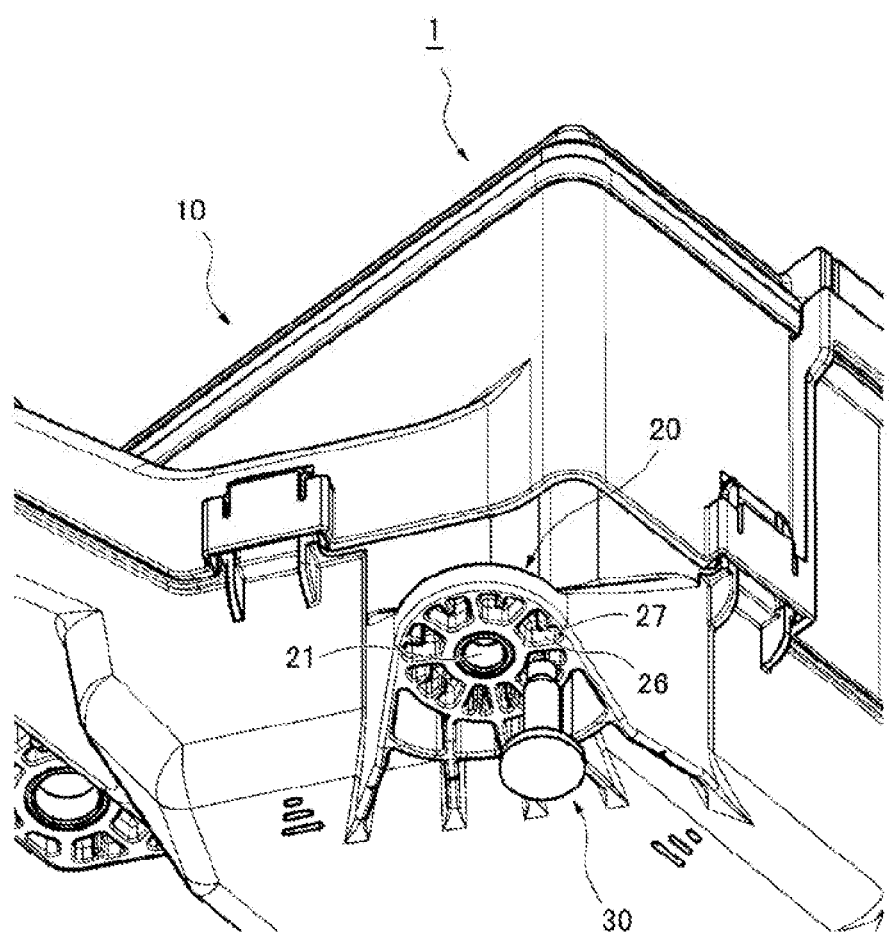
FIG. 3 is a view for explaining that an entry prevention portion prevents a stud bolt from being erroneously inserted into a recessed portion provided in the vicinity of an edge portion of a through hole in an attachment surface.

As shown in FIG. 3, the protruding portion 27 functions to prevent the fastening member 30 from entering the recessed portion 26. That is, if there is no protruding portion 27, the fastening member 30 can enter the recessed portion 26. However by virtue of the provision of the protruding portion 27, tire fastening member 30 interferes with the protruding portion 27, and thus the fastening member 30 cannot enter the recessed portion 26.

As shown in FIG. 3, as the fastening member 30, may be provided a stud bolt, a weld bolt, or the like having a step between a cylindrical leg portion (a rod-shaped portion) and a base portion, the cylindrical leg portion having a smaller diameter than the base portion, the cylindrical leg portion being located on a side of a tip end of the bolt or the like. Alternatively, a stud bolt, a weld bolt, or the like having only the cylindrical leg portion (the rod-shaped portion) having a same diameter over the entire length of the bolt or the like may be provided. A tip end of the leg portion of the fastening member 30 can enter the recessed portion 26 if there is no protruding portion 27. However, by virtue of the protruding portion 27, the tip end cannot enter the recessed portion 26 by interfering with the protruding portion 27. In this way, the protruding portion 27 can prevent the fastening member 30 from being erroneously inserted into the recessed portion 26 provided around the edge portion of the through hole 21.

As described above, according to the electric connection box 1 according to the embodiment of the present invention, the plurality of recessed portions 26 provided around the edge portion of the through hole 21 on the attachment surface 22 of the bracket 20 are provided with the protruding portions 27 for preventing the fastening member 30 from entering the respective recessed portions 26. Therefore, the fastening member 30 can be prevented from being erroneously inserted into the recessed portion 26 positioned around the edge portion of the through hole 21 by virtue of the protruding portion 27.

In addition, according to the electric connection box 1 according to the embodiment of the present invention, the protruding portion 27 is provided on the recessed portion 26 positioned between adjacent radial ribs 25 among the plurality of radial ribs 25 extending radially from the edge portion of the through hole 21. Therefore, the protruding portion 27 can be easily provided on the recessed portion 26 positioned around the edge portion of the through hole 21.

Further, according to the electric connection box 1 according to the embodiment of the present invention, in the recessed portion 26 positioned between the adjacent radial ribs 25, a circumferential length of the side wall of the recessed portion 26, the side wall being provided radially outward of the recessed portion 26 (side wall on a radially outer side), is longer than a circumferential length of the side wall of the recessed portion 26, the side wall being provided radially inward of the recessed portion 26 (side wall on a radially inner side). Therefore, by providing the protruding portion 27 such that the protruding portion 27 extends radially inward from the side wall on the radially outer side of the recessed portion 26 toward the inside of the recessed portion 26, it is easier to secure a space for providing the protruding portion 27 as compared with a case of providing the protruding portion extending radially outward from the side wall on the radially inner side of the recessed portion 26 toward the inside of the recessed portion 26. As a result, the protruding portion 27 can be more easily provided on the recessed portion 26 positioned between the adjacent radial ribs 25.

Further, according to the electric connection box 1 according to the embodiment of the present invention, a distance between the side wall of the recessed portion 26 provided on a radially inner side and a tip end of the entry prevention portion 27 is smaller than diameter of the through hole 21. Therefore the fastening member 30 cannot enter the recessed portions 26 by virtue of the provision of the entry prevention portion 27.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

In the embodiment described above, as an "entry prevention portion" of the present invention, the protruding portion 27 extending radially inward from the side wall on the radially outer side of the recessed portion 26 toward the inside of the recessed portion 26 is provided Meanwhile, as the "entry prevention portion" of the present invention, a protruding portion extending radially outward from the side wall on the radially inner side of the recessed portion 26 toward the inside of the recessed portion 26 may be provided. Further, as the "entry prevention portion" of the present invention, an isolated protruding portion protruding from a central portion of a bottom wall of the recessed portion 26 to the inside of the recessed portion 26 independently from the side wall of the recessed portion 26 may also be provided.

In the embodiment described above, the protruding portions 27 are provided in all the recessed portions 26 positioned around the edge portion of the through hole 21. Meanwhile, among the plurality of recessed portions 26 positioned around the edge portion of the through hole 21, the protruding portion 27 may be provided only on one or the plurality of recessed portions 26 in which the fastening member 30 tends to be particularly easily erroneously inserted when the electric connection box 1 is attached to the vehicle.

In the embodiment described above, the protruding portion 27 provided as the "entry prevention portion" of the present invention is a part of the bracket 20 that is the resin molded product (that is, the protruding portion 27 is a part of the resin molded product). Meanwhile, as the "entry prevention portion" of the present invention, a component which is to be attached to the recessed portion 26 of the bracket 20, which is the resin molded product, may be adopted.

According to an aspect of the embodiments described above, an electric connection box (1) includes a housing (10) configured to accommodate at least one electronic component and an attachment portion (20) provided on tire housing (10), the attachment portion (20) including a through hole (21) through which a fastening member (30) is to be inserted and an attachment surface (22) configured, when the housing (10) is attached to an object, to face the object, the housing being to be attached to the object at the attachment portion (20) by the fastening member (30). A plurality of recessed portions (26) are provided around an edge portion defining the through hole (21), the plurality of recessed portions (26) being provided on the attachment surface (22). At least one of the plurality of recessed portions (26) is provided with an entry prevention portion (27) configured to prevent the fastening member (30) from entering the recessed portion (26).

According to the electric connection box having the above configuration, at least one of the plurality of recessed portions positioned around the edge portion defining the through hole on the attachment surface of the attachment portion is provided with the entry prevention portion for preventing the fastening member from entering the recessed portion. Therefore, the entry prevention portion can prevent the fastening member from being erroneously inserted into the recessed portion positioned around the edge portion of the through hole.

The attachment surface (22) may be provided with a plurality of radial ribs (25) extending outward from the edge portion of the through hole (21) in a radial direction of the through hole The at least one of the plurality of recessed portions (26) provided with the entry prevention portion (27) may be provided between adjacent radial ribs (25) among the plurality of radial ribs (25).

According to the electric connection box having the above configuration, the entry prevention portion is provided on the recessed portion positioned between the adjacent radial ribs among the plurality of radial ribs extending radially from the edge portion of the through hole. Therefore, the entry prevention portion can be easily provided on the recessed portion positioned around the edge portion of the through hole.

The entry prevention portion (27) may extend from a side wall of the recessed portion (26) toward an inside of the recessed portion (26), the side wall being arranged at an outer end of the recessed portion (26) in the radial direction.

According to the electric connection box having the above configuration, in the recessed portion positioned between the adjacent radial ribs, a circumferential length of the side wall of the recessed portion, the side wall (first side wall) being provided radially outward of rite recessed portion is longer than a circumferential length of a side wall (second side wall) of tire recessed portion being provided radially inward of the recessed portion. Therefore, by providing the protruding portion extending radially inward from the side wall on the radially outer side of the recessed portion toward the inside of the recessed portion, it is easier to secure a space for providing the protruding portion as compared with a case of providing the protruding portion extending radially outward from the side wall on the radially inner side of the recessed portion toward the inside of the recessed portion. As a result, the entry prevention portion can be more easily provided on the recessed portion positional between the adjacent radial ribs.

A distance between a side wall of the recessed portion (26) and a tip end of the entry prevention portion (27) may be smaller than a diameter of the through hole (21), the side wall being arranged at an inner end of the recessed portion (26) in the radial direction.

According to the electric connection box having the above configuration, a distance between the side wall (second side wall) of the recessed portion 26 provided on a radially inner side and a tip end of the entry prevention portion 27 is smaller than diameter of the through hole 21. Therefore the entry prevention portion 27 can hinder the fastening member 30 from entering the recessed portions 26.

What is claimed is:

1. An electric connection box comprising:
   a housing configured to accommodate at least one electronic component; and
   an attachment portion provided on the housing, the attachment portion comprising: a through hole through which a fastening member is to be inserted; and an attachment surface configured, when the housing is attached to an object, to face the object, the housing being to be fixed to the object at the attachment portion by the fastening member,
   wherein a plurality of recessed portions are provided around an edge portion defining the through hole, the plurality of recessed portions being provided on the attachment surface, and
   wherein at least one of the plurality of recessed portions is provided with an entry prevention portion therein configured to prevent the fastening member from entering the recessed portion.

2. The electric connection box according to claim 1 wherein the attachment surface is provided with a plurality of radial ribs extending outward from the edge portion of the through hole in a radial direction of the through hole, and
   wherein the at least one of the plurality of recessed portions provided with the entry prevention portion is provided between adjacent radial ribs among the plurality of radial ribs.

3. The electric connection box according to claim 2, wherein the entry prevention portion extends from a first side wall of the recessed portion toward an inside of the recessed portion, the first side wall being arranged at an outer end of the recessed portion in the radial direction.

4. The electric connection box according to claim 3, wherein a distance between a second side wall of the recessed portion and a tip end of the entry prevention portion is smaller than a diameter of the through hole, the second side wall being arranged at an inner end of the recessed portion in the radial direction.

5. The electric connection box according to claim 1, wherein the entry prevention portion is arranged as a protrusion towards the through hole and from a side wall of at least one of the recessed portions in a radial direction of the through hole.

6. An electric connection box comprising:

a housing configured to accommodate at least one electronic component; and an attachment portion provided on the housing, the attachment portion comprising: a through hole through which a fastening member is to be inserted; and an attachment surface configured, when the housing is attached to an object, to face the object, the housing being to be fixed to the object at the attachment portion by the fastening member, wherein a plurality of recessed portions are provided around an edge portion defining the through hole, the plurality of recessed portions being provided on the attachment surface, wherein at least one of the plurality of recessed portions is provided with an entry prevention portion configured to prevent the fastening member from entering the recessed portion, wherein the attachment surface is provided with a plurality of radial ribs extending outward from the edge portion of the through hole in a radial direction of the through hole, wherein the at least one of the plurality of recessed portions provided with the entry prevention portion is provided between adjacent radial ribs among the plurality of radial ribs, and wherein the entry prevention portion extends from a first side wall of the recessed portion toward an inside of the recessed portion, the first side wall being arranged at an outer end of the recessed portion in the radial direction.

* * * * *